United States Patent [19]

Miura

[11] Patent Number: 4,720,193

[45] Date of Patent: Jan. 19, 1988

[54] OPTICAL FIBER GYROSCOPE

[75] Inventor: Hiromasa Miura, Iida, Japan

[73] Assignee: Tamagawa Seiki Kabushiki Kaisha, Japan

[21] Appl. No.: 730,565

[22] Filed: May 6, 1985

[30] Foreign Application Priority Data

May 21, 1984 [JP] Japan ............................... 59-100664

[51] Int. Cl.$^4$ ...................... G01B 9/02; G01C 19/64
[52] U.S. Cl. .................................................... 356/350
[58] Field of Search .......................................... 356/350

[56] References Cited

PUBLICATIONS

"Optical Fibre Gyroscope Using a Coherent Source", Giles et al.; Conference: Colloquium on Optical Fibre Sensors, (1982) London, England (26 May, 1982), pp. 8/1–8/4.
"Technical Material Collection on Optical Fiber Sensors (Hikari–fiber Sensor Gijutu Shiryo-Shu)", p. 263, issued Aug. 19, 1983, Diichi International K.K.

Primary Examiner—Vincent P. McGraw
Attorney, Agent, or Firm—Leydig, Voit & Mayer

[57] ABSTRACT

An improved optical fiber gyroscope is provided to determine the angular velocity of an optical system. A beam of light emitted from a coherent light source are split into first and second light components. The first light component is further split into third and fourth light components while the second light component is further split into fifth and sixth components. The third and fifth light components are passed through a coil-like optical fiber in opposite directions to each other while the fourth and sixth light components are passed through an optical modulator in opposite directions to each other. The third and fourth light components are made to be interfered in a photodetector while the fifth and sixth light components are made to be interfered in another photodetector. From the outputs of the photodetectors, the above angular velocity is determined.

3 Claims, 2 Drawing Figures

OPTICAL FIBER GYROSCOPE

BACKGROUND OF THE INVENTION

The present invention relates generally to an optical fiber gyroscope, and more particularly to an optical fiber gyroscope which is specifically adapted to the measurement of an angular velocity in a rotary optical system.

Referring firstly to FIG. 1, there is shown a schematic block diagram which depicts a fundamental construction of a typical optical fiber gyroscope, as found, for instance, in the "Technical Material Collection on Optical Fiber Sensors (Hikari-fiber Sensor Gijutu Shiryo-shu)", p 263, issued Aug. 19, 1983, Diichi International K.K., wherein a beam of light emitted from a light source 10 such as a laser beam source is shown directed through a beam splitter 12a, a polarizer 14 and a beam splitter 12b to a condenser lens 15b, and then by this lens it is guided into a single-mode optical fiber loop 16, passing therethrough and comming out into the beam splitter 12b, where it is then passed on a return route through the polarizer 14 and then reflected by the beam splitter 12a so as to be eventually inputted to a photodetector 18. This generally describes the case where a light beam is directed through the optical fiber loop 16 in a clockwise direction as viewed in FIG. 1, and when passing in a counter-clockwise direction, it is notable only with a difference in the route of propagation such that the light beam is directed into the condenser lens 15a after being reflected by the beam splitter 12b, then led to pass through the optical fiber loop 16, and out on a return route through the condenser lens 15b and through the beam splitter 12b.

When an optical beam as shown in FIG. 1 is turned in a given direction at an angular velocity $\Omega$ with respect to the inertial space, there would be observed a difference in the propagation times of light beams passing clockwise and counter-clockwise through the optical fiber loop 16, and as a consequence, there would occur a phase difference $\Delta\theta$ which may be expressed by the following equation and which is known as the Sagnac effect, as appeared in the above noted literature, that is:

$$\Delta\theta = \frac{4\pi l a}{c\lambda} \cdot \Omega \quad (1)$$

where:
l is the length of the optical fiber;
a is the radius of the optical fiber;
c is the velocity of light (in the vacuum state); and
$\lambda$ is the wave length of an incident light.

In consequence, when detecting both light beams passing through these clockwise and counter-clockwise routes by way of the photodetector 18 after both having been interfered with each other, it is noted that an electric signal outputted from the photodetector 18 will be a function of the phase difference $\Delta\theta$, thus obtaining the value of $\Delta\theta$, and thus deriving a desired value of angular velocity $\Omega$.

In this connection, while it is known that the output from the photodetector 18, according to the basic construction as shown in FIG. 1, changes in proportion to $\cos \Delta\theta$, one problem with this construction as reviewed generally above is that there is not attainable in practice a sufficiently good sensitivity which is enough to detect a fine rotation of the optical system.

According to the prior art, while there have been proposed to date many measures such as of using the optical phase modulation, the frequency modulation, the photo-heterodyne detection, etc., they would inevitably turn out with the following drawbacks:

(a) In an optical system where there are involved certain elements on one, i.e., a clockwise route of propagation for a light beam which are different from those of the other, i.e., counter-clockwise, route, there is available no efficient means to eliminate a substantial fluctuation as encountered due to the different routes in the system.

(b) While it is feasible to modify the construction of the photodector in such a manner that its output is in proportional to $\sin \Delta\theta$, instead of $\cos \Delta\theta$, the problem of a non-linearity in the relationship between the angular velocity $\Omega$ and a value of $\sin \Delta\theta$ would not be solved.

(c) If in practice there occurs a substantial difference in the frequencies of light beams when passed in the optical fiber loop clockwise on the one hand and counter-clockwise on the other hand, there would occur a substantial fluctuation in the outputs from the photodetector owing to changes in the temperature of the optical fiber loop.

(d) When there is adapted the frequency modulation by way of an acousto-optic light modulator (a light modulator device taking advantage of the isotropic Bragg diffraction), as a beat frequency of the output from the modulator would coincide with a given sound frequency, it would inevitably turn out to be complex in electric processings as to the operation thereof.

SUMMARY OF THE INVENTION

An object of the present invention is to provide an improved optical fiber gyroscope, which provides an efficient solution to the above mentioned problems, and which is simple in construction and electrical processing of the optical signal.

An optical fiber gyroscope according to the present invention comprises a first beam splitter adapted to split a light beam emitted from a coherent light source into first and second light components, a second beam splitter adapted to split the first light component into third and fourth light components, a third beam splitter adapted to split the second component light into fifth and sixth light components, an optical fiber loop disposed in a coil fashion, first and second photodetectors adapted to convert a light signal into a corresponding electric signal, condenser lenses adapted to direct the third light component passing through the optical fiber loop, a light modulator adapted to let the fourth component light pass therethrough and a phase detecting circuit connected to both of the photodetectors. The third and fourth components of light are directed by the third beam splitter so as to be received by the first photodetector, where they are interfered with each other. The fifth light component is directed by the condenser lenses through the same propagation route as, while in the opposite direction to, the third light component, and the sixth light component is directed through the optical modulator in the opposite direction to that of the fourth component. These fifth and sixth light components are directed by the second beam splitter so as to be received by the second photodetector, where they are interfered with each other. The phase detecting circuit operates to detect a phase difference from the outputs from the first and second photodetectors, thus obtaining the angular velocity of the rotary optical system.

The above noted and further objects, features and advantages of the present invention will now become more apparent by reference to the following description of a preferred embodiment of the invention taken in conjunction with the accompanying drawings.

BRIEF DESCRIPTION OF THE DRAWING

In the drawings, identical or like parts are designated by like reference numerals.

DETAILED DESCRIPTION OF THE PREFERRED EMBODIMENT

Figure 1:
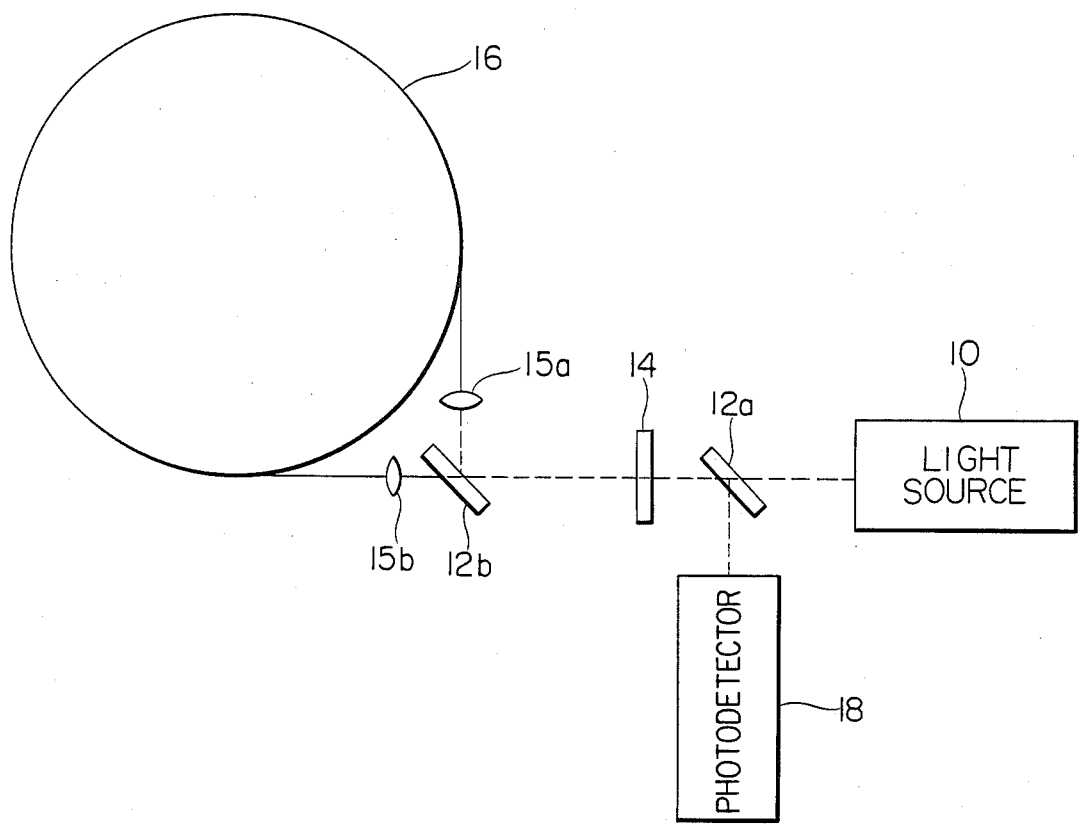
FIG. 1 is a schematic block diagram showing the fundamental construction of a conventional optical fiber gyroscope.
Figure 2:
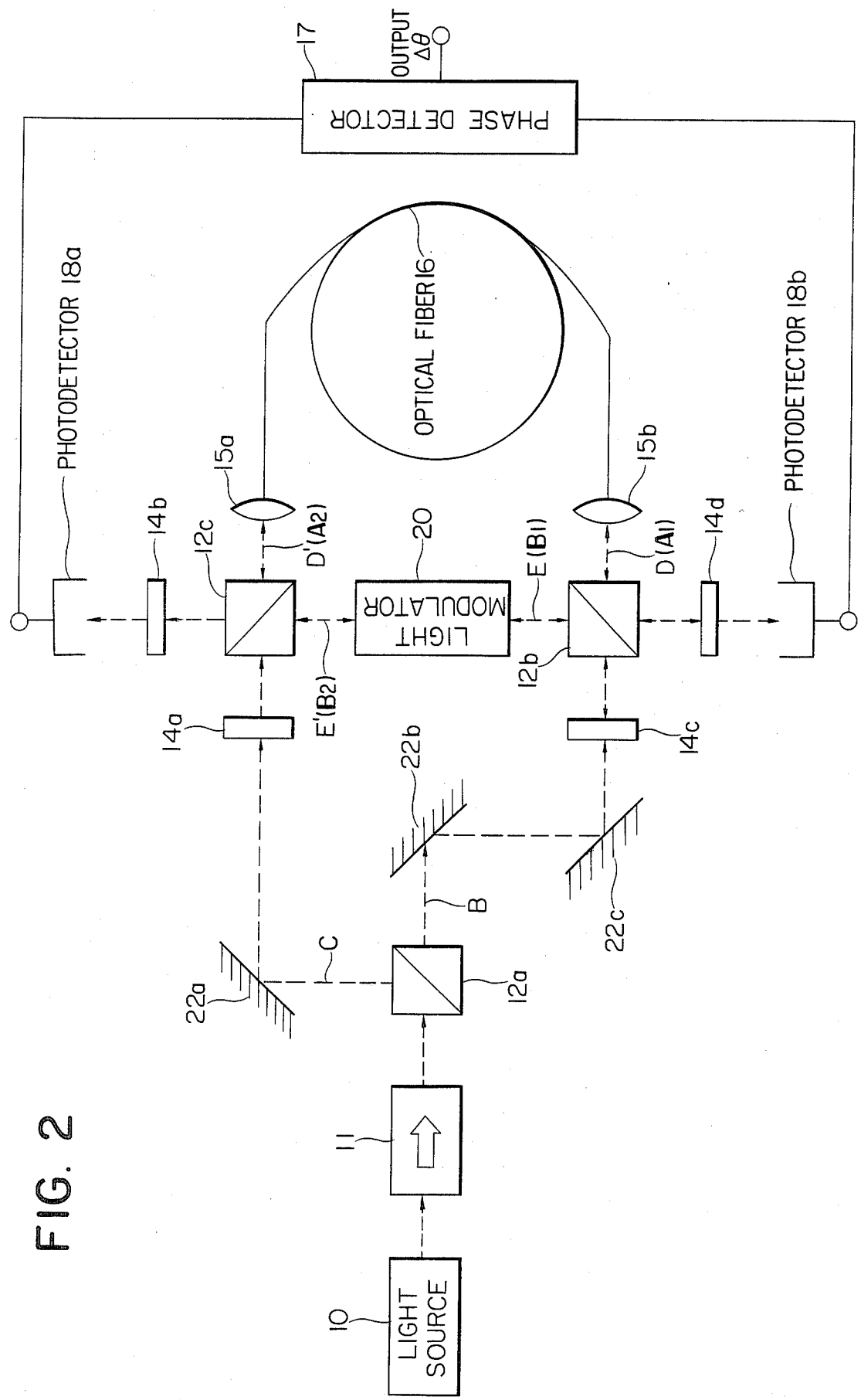
FIG. 2 is a schematic block diagram showing the general construction of an optical fiber gyroscope in accordance with a preferred embodiment of the invention.

The present invention will now be described by way of a preferred embodiment thereof shown in FIG. 2 as being adapted in practice to the construction of an optical fiber gyroscope. Referring to FIG. 2, it is seen with a substantial difference from the construction shown in FIG. 1 that there are provided a beam splitter 12c in addition to beam splitters 12a and 12b in this embodiment, and that there are also provided an optical isolator 11, four polarizers 14a, 14b, 14c, 14d, two photodetectors 18a, 18b, a light modulator 20 which comprises an optical phase modulator or a light frequency modulator, an optical phase detecting circuit 17, and totally reflecting mirrors 22a, 22b, 22c. Incidentally, these elements may be of any ones which are available commercially.

Firstly, there will be described the operation of the invention in which an optical phase modulator which is available, for example, from Inrad (Interactive Radiation) Inc., U.S.A., as Model 620 series devices, is adapted as an optical modulator 20 in circuit.

A beam of light emitted from a light source 10 is firstly split into first and second light components B and C by a beam splitter 12a, the light component B being reflected by totally reflecting mirrors 22b and 22c and then split further into third and fourth light components D and E by a beam splitter 12b. The thus-split light component D is then directed to an optical fiber loop 16 of the polarization plane preservation type by way of a condenser lens 15b, and after having passed therethrough, it is then directed through a condenser lens 15a to a beam splitter 12c, by which it is reflected and then directed through a polarizer 14b to a photodetector 18a.

The light component E is directed through the optical modulator 20, a beam splitter 12c and a polarizer 14b to a photodetector 18a. In consequence, the light component B is, after having been split into the light components D and E, directed to the photodetector 18a, through two different paths or routes of propagation respectively, where they are interfered with each other, accordingly. These light components which are introduced and interfered with each other in the photodetector 18a are to be referred hereinafter to as vectors $A_1$ and $B_1$, respectively.

On the other hand, the component light C is, after having been reflected by a totally reflecting mirror 22a and having passed through a polarizer 14a, led to the beam splitter 12c, where it is split into fifth and sixth light components D' and E'. Now these light components are directed in the same route but in the opposite direction to that of the components D and E. More specifically, the light component D' is firstly directed through the condenser lens 15a, the optical fiber loop 16 and the condenser lens 15b to the beam splitter 12b, where the light component is reflected through the polarizer 14d to the photodetector 18b, while the light component E' is directed through the optical modulator 20, the beam splitter 12b and the polarizer 14d to the photodetector 18b, where it is interfered with the component light D'. Hereinafter, these light components to be interfered with each other will be referred to as vectors $A_2$ and $B_2$, respectively.

Now, let these components $A_1$, $A_2$ and $B_1$, $B_2$ be expressed by the following equations;

$$A_i = A_{oi} \cdot \exp\{j[\omega_o t + \phi_i]\} (i = 1, 2) \quad (2)$$

$$B_i = B_{oi} \cdot \exp\{j[\omega_o t + \psi_i]\} (i = 1, 2) \quad (3)$$

where, $A_{oi}$ and $B_{oi}$ are assumed to be a monochromatic planar wave having the same frequency. Such light components may readily be obtained by the use of a single mode type laser device for the light source 10.

In this case, an electric signal output $I_1$ from the photodetector 18a and an electric signal output $I_2$ from the photodetector 18b are given in the following general equation:

$$I_i = I_{Ai} + I_{Bi} + 2\sqrt{I_{Ai} \cdot I_{Bi}} \cos\Delta\phi_i \ (i = 1, 2) \quad (4)$$

where, $I_{Ai}$ and $I_{Bi}$ represent the quantity of light components $A_i$ and $B_i$, respectively, and $\Delta\phi_i$ is given by the equation:

$$\Delta\phi_i = \phi_i - \psi_i \ (i=1, 2) \quad (5)$$

where, phase difference $\Delta\phi_1$ represents a value which is produced from the difference between the route of propagation by way of the optical fiber loop 16 and the route through the optical modulator 20 not by way of the optical fiber loop 16 among two routes of propagation for the light components $A_1$ and $B_1$, and a phase difference $\Delta\theta_2$ represents a value which is produced from the difference between the route of propagation by way of the optical fiber loop 16 and the route through the optical modulator 20 not by way of the optical fiber loop 16 among two routes of propagation for the light components $A_2$ and $B_2$, respectively. In other words, therefore, it is notable that these phase differences $\Delta\theta_1$ and $\Delta\theta_2$ are produced from similar propagation routes, but in the opposite directions of propagation.

As a consequence, if the optical system as shown in FIG. 2 is kept stationary with respect to the inertial space, the following relationship may be given;

$$\Delta\phi_1 - \Delta\phi_2 = 0 \quad (6)$$

and then, if this optical system rotates at an angular velocity $\Omega$ with respect to the inertial space, this relation is given as follows;

$$\Delta\phi_1 - \Delta\phi_2 = \Delta\theta \quad (7)$$

Now, the value of $\Delta\theta$ is a phase difference as produced from the Sagnac effect in connection with two beams of light propagating along the optical fiber loop 16 in opposite directions with respect to each other, which may be represented by the equation (1) as noted above.

Now, let the phase difference of a light beam to be controlled while passing through the optical modulator 20 be expressed by the following equation:

$$\Delta\phi i = \nu t + \eta i \quad (i=1, 2) \qquad (8)$$

and by substituting this equation (8) into the equation (4), we have:

$$I_1 = I_{A1} + I_{B1} + 2\sqrt{I_{A1} \cdot I_{B1}} \cos(\nu t + \eta_1) \qquad (9)$$

$$I_2 = I_{A2} + I_{B2} + 2\sqrt{I_{A1} \cdot I_{B2}} \cos(\nu t + \eta_2) \qquad (10)$$

On the other hand, from the equations (7) and (8), we have:

$$\eta_1 - \eta_2 = \Delta\theta \qquad (11)$$

From this, it is seen that the AC components as expressed in equations (9) and (10) are a function of the phase difference $\Delta\theta$. Consequently, by detecting such AC components of equations (9) and (10) from the output signals of the photodetectors 18a and 18b, respectively, and by detecting a phase difference between two output signals by way of the commonly known phase detecting circuit 17, it is possible to detect $\Delta\theta$, and thus determine from the equation (1) the angular velocity $\Omega$ of the optical system of the construction shown in FIG. 2.

Next, referring to another embodiment of the invention wherein an optical frequency detector which is commercially available from, for example, Isomet Inc., U.S.A. (generally, an acousto-optic modulator) is employed as the optical modulator 20, an explanation will now be given on the operation of the system according to the invention.

It is noted that the optical modulator 20 is designed to shift the frequency of light passing therethrough by a value of f. With this fact in mind, we may rewrite the equation (3) as follows:

$$B_i = B_{oi} \cdot \exp\{j[(\omega_0 + 2\pi f)t + \phi_i]\} (i=1, 2) \qquad (12)$$

From the equations (2) and (12), the electric outputs $I_1$ and $I_2$ from the photodetectors 18a and 18b after having been interfered with each other may be written as follows:

$$I_1 = I_{A1} + I_{B1} + 2\sqrt{I_{A1} \cdot I_{B1}} \cos(2\pi f t + \Delta\phi_1) \qquad (13)$$

$$I_2 = I_{A2} + I_{B2} + 2\sqrt{I_{A2} \cdot I_{B2}} \cos(2\pi f t + \Delta\phi_2) \qquad (14)$$

As equations (13) and (14) may be adapted correspondingly with the relationship of the equation (7), the AC components as obtained from the equations (13) and (14) turn out in correspondence to be a function of the phase difference $\Delta\theta$ with the same frequency. In consequence, by taking the AC components from the output signals from the photodetectors 18a and 18b and by detecting the phase difference electrically in the like manner as noted in the foregoing case, it is now feasible to detect a value of $\Delta\theta$, thus making it possible to obtain a current angular velocity $\Omega$ from the equation (1).

Now, among the features as reviewed fully hereinbefore, it is not essential in accordance with the construction of the invention to use a polarization plane preservation type fiber as an optical fiber to provide for the optical isolator in the light emitting portion of the light source and further to adopt the polarizers or the totally reflecting mirrors as incorporated in an appropriate manner, since they belong to the practice that is generally known to those skilled in the art.

Several advantageous effects can now be achieved from the optical fiber gyroscope of the present invention when put into practice, which may be summarized as follows.

(a) By virtue of the employment of the route of light propagation which takes the advantage of the Sagnac effect, both beams of light pass through one and the same route in a single polarization plane and with the same frequency in the clockwise and counter-clockwise directions. Consequently, there is rendered on these light beams no adverse effect such as the lack of symmetry in the light routes and the fluctuation in temperature characteristics of the optical fiber. (In the practice of the construction shown in FIG. 1, it would present a rather poor sensitivity because of its output turning to be proportional to the value of $\cos \Delta\theta$.)

(b) By the adoption of such construction that two light components may pass through each of the light propagation routes in the optical system, it is advantageous that the interference as produced by these light components can now effect to cancel any possible drifts existing in such propagation routes, thus efficiently overruling the effect of minute fluctuations in the performance of the optical fiber.

(c) By virtue of the construction that a value of $\Delta\theta$ may be obtained immediately as an output from the system, a proper linearity with respect to an angular velocity $\Omega$ may be secured, and thus providing the largest possible dynamic range in the performance of the system.

(d) When employing two acoustic-optical modulators in series circuit as optical frequency modulator means, a shift in the frequency f may be made as small as possible, thus effecting an advantage of easy electric processing in the operation of the system.

The invention as shown and described in the foregoing preferred embodiments is not intended to be limited to such embodiments, but rather the invention may extend to all such designs and modifications as come within the due scope of the appended claims.

What is claimed is:

1. An optical fiber gyroscope comprising first means for splitting an incident beam of light emitted from a coherent light source into first and second light components, second means for splitting said first light component into third and fourth light components, third means for splitting said second light component into fifth and sixth light components, optical fiber loop means disposed in a coil fashion, first and second photodetecting means for converting a light signal into a corresponding electric signal, fourth means for directing said third and fifth light components to pass through said optical fiber loop means in opposite directions, light modulating means comprising two optical frequency modulators operatively connected in series for finely adjusting the frequency of said fourth and said sixth light components passing therethrough in opposite directions, and phase detecting circuit means connected to both of said photodetecting means, wherein said third and fourth light components are directed by said third means so as to be received by said first photodetecting means in which said received light components interfere with each other, said fifth and sixth light components are directed by said second means so as to be received by said second photodetecting means in which said received light components interfere with each other, and wherein said phase detecting circuit means are operable to detect a phase difference from the outputs of said first and second photodetecting means, whereby the angular velocity of a rotary optical system is determined.

2. The optical fiber gyroscope as claimed in claim 1 wherein said optical frequency modulators are acoustic-optical frequency modulators.

3. An optical fiber gyroscope comprising first means for splitting an incident beam of light emitted from a coherent light source into first and second light components, second means for splitting said first light component into third and fourth light components, third means for splitting said second light component into fifth and sixth light components, optical fiber loop means disposed in a coil fashion, first and second photodetecting means for converting a light signal into a corresponding electric signal, fourth means for directing said third and fifth light components to pass through said optical fiber loop means in opposite directions, light modulating means comprising an optical phase modulator for adjusting the frequency of said fourth and said sixth light components passing therethrough in opposite directions, and phase detecting circuit means connected to both of said photodetecting means, wherein said third and fourth light components are directed by said third means so as to be received by said first photodetecting means in which said received light components interfere with each other, said fifth and sixth light components are directed by said second means so as to be received by said second photodetecting means in which said received light components interfere with each other, and wherein said phase detecting circuit means are operable to detect a phase difference from the outputs of said first and second photodetecting means, whereby the angular velocity of a rotary optical system is determined.

* * * * *